United States Patent
Zhang et al.

(10) Patent No.: US 12,498,343 B1
(45) Date of Patent: Dec. 16, 2025

(54) BIMETALLIC MONATOMIC NANO-ENZYME ELECTROCHEMICAL SENSOR, AND PREPARATION METHOD THEREFOR AND APPLICATION THEREOF

(71) Applicant: INSTITUTE OF FOOD SCIENCE AND TECHNOLOGY, CHINESE ACADEMY OF AGRICULTURAL SCIENCES, Beijing (CN)

(72) Inventors: Dequan Zhang, Beijing (CN); Xiaochun Zheng, Beijing (CN); Guangchun Song, Beijing (CN); Li Chen, Beijing (CN); Cheng Li, Beijing (CN); Shaobo Li, Beijing (CN); Mengyu Shang, Beijing (CN)

(73) Assignee: INSTITUTE OF FOOD SCIENCE AND TECHNOLOGY, CHINESE ACADEMY OF AGRICULTURAL SCIENCES, Beijing (CN)

( * ) Notice: Subject to any disclaimer, the term of this patent is extended or adjusted under 35 U.S.C. 154(b) by 0 days.

(21) Appl. No.: 19/187,977

(22) Filed: Apr. 23, 2025

(30) Foreign Application Priority Data

Nov. 29, 2024 (CN) .......................... 202411730801.3

(51) Int. Cl.
*G01N 27/327* (2006.01)
*G01N 27/30* (2006.01)
*G01N 33/12* (2006.01)

(52) U.S. Cl.
CPC ....... *G01N 27/3277* (2013.01); *G01N 27/301* (2013.01); *G01N 27/3278* (2013.01); *G01N 33/12* (2013.01)

(58) Field of Classification Search
CPC ............ G01N 27/3277; G01N 27/301; G01N 27/3278; G01N 33/12
See application file for complete search history.

(56) References Cited

U.S. PATENT DOCUMENTS

| 7,442,232 B2 * | 10/2008 | White ................. B01J 20/3491 502/103 |
| 2016/0052949 A1 * | 2/2016 | Beckham ............... C10G 1/086 568/322 |

OTHER PUBLICATIONS

Ahmed et al., "Photocatalytic conversion of carbon dioxide into methanol using zinc-copper-M(III) (M = aluminum, gallium) layered double hydroxides," 2011, Journal of Catalysis, vol. 279, pp. 123-135 (Year: 2011).*

* cited by examiner

*Primary Examiner* — Luan V Van
*Assistant Examiner* — Kaylee Tseng
(74) *Attorney, Agent, or Firm* — JCIPRNET

(57) ABSTRACT

The present disclosure is related to a bimetallic monatomic nano-enzyme electrochemical sensor, and a preparation method therefor and an application thereof. The bimetallic monatomic nano-enzyme electrochemical sensor comprises a working electrode, a counter electrode, a reference electrode and an electric signal control device; the working electrode is formed by coating a gallium-copper bimetallic monatomic nano-enzyme and a conductive carbon paste on a flexible carrier; and according to the present disclosure, the electrochemical sensor is constructed by loading a catalytic material of the gallium-copper bimetallic monatomic nano-enzyme on an electrode substrate material, which is used for detecting a volatile amine content in fresh meat, so as to detect a freshness of fresh meat.

3 Claims, 9 Drawing Sheets

BIMETALLIC MONATOMIC NANO-ENZYME ELECTROCHEMICAL SENSOR, AND PREPARATION METHOD THEREFOR AND APPLICATION THEREOF

CROSS-REFERENCE TO RELATED APPLICATION

This application claims the priority benefit of China application no. 202411730801.3, filed on Nov. 29, 2024. The entirety of each of the above-mentioned patent applications is hereby incorporated by reference herein and made a part of this specification.

TECHNICAL FIELD

The present disclosure relates to the technical field of food safety inspection. More particularly, the present disclosure relates to a bimetallic monatomic nano-enzyme electrochemical sensor, and a preparation method therefor and an application thereof.

BACKGROUND OF RELATED ART

Fresh meat is easily influenced by external and internal microorganisms during the processing, transportation, storage and sales of fresh meat, and thus breeding a large number of bacteria. Under actions of specific microorganisms, proteins are further decomposed and volatile amines are generated, leading to unpleasant odor, deterioration or spoilage of foods. The volatile amine can not only directly reflect the deterioration and spoilage of meat, but also cause harm to human health. Establishing a real-time and efficient detection method for volatile amine has become a necessary measure to ensure food quality and safety, wherein traditional detection methods such as gas chromatography, gas chromatography-mass spectrometry, and high performance liquid chromatography are having certain defects, such as needing professionals for operation and high cost, and failing to meet current rapid and portable detection requirements.

In order to meet many challenges in meat freshness detection, some fast and portable sensing detection technologies are applied to the meat freshness detection, such as a colorimetric sensing detection method, a fluorescence sensing detection method and an electrochemical sensing detection method. However, in an actual detection and application process, the colorimetric sensing detection method has the defects of low detection sensitivity and strong subjectivity; and in the fluorescent sensing detection method, toxic and harmful reagents are mostly used in a preparation and synthesis process, which has certain food safety hazards. Therefore, compared with the above two sensing detection methods, the electrochemical sensing detection method has the advantages of high sensitivity, simple operation, high cost-effectiveness, environmental protection and no pollution, and current application technology of the electrochemical sensing detection method in the meat freshness detection has not been reported yet.

Monoatomic nano-enzyme, as a novel nano-material with high catalytic performance, has been widely used in the field of food safety detection. However, in an application process of rapid and portable meat freshness detection, monometallic monatomic nano-enzyme has some defects, such as low catalytic activity, insufficient selectivity and poor durability, thus being unable to be widely applied in an actual detection process. Therefore, by reasonable design and structural optimization, a bimetallic monatomic nano-enzyme catalytic material is constructed, and a synergistic catalytic effect of bimetallic atoms can significantly improve the catalytic activity, selectivity and durability, so that the material is expected to be widely used in the field of meat freshness detection.

To sum up, a fast, portable and low-cost electrochemical sensing detection method is constructed based on an excellent catalytic performance of the bimetallic monatomic nano-enzyme, and is of great research significance to detect the volatile amine generated in a process of meat spoilage.

SUMMARY OF THE INVENTION

One objective of the present disclosure is to solve at least the above problems, and to provide at least the advantages that will be described hereinafter.

Another objective of the present disclosure is to provide a bimetallic monatomic nano-enzyme electrochemical sensor, and a preparation method therefor and an application thereof, and according to the present disclosure, the electrochemical sensor is constructed by loading a catalytic material of a gallium-copper bimetallic monatomic nano-enzyme on an electrode substrate material, which is used for detecting a volatile amine content in fresh meat, so as to evaluate a degree of meat spoilage, and finally detect the freshness of fresh meat. This detection method is simple and rapid to operate, has high sensitivity, does not need toxic and harmful reagents, and has the advantage of environmental protection.

In order to achieve these objectives and other advantages according to the present disclosure, a preparation method for a bimetallic monatomic nano-enzyme electrochemical sensor is provided, wherein the bimetallic monatomic nano-enzyme electrochemical sensor comprises a working electrode, a counter electrode, a reference electrode, and an electric signal control device; and the working electrode is formed by coating a gallium-copper bimetallic monatomic nano-enzyme and a conductive carbon paste on a flexible carrier; and a synthetic method for the gallium-copper bimetallic monatomic nano-enzyme specifically comprises the following steps:

S1: mixing copper nitrate trihydrate, aluminum nitrate nonahydrate, anhydrous copper chloride and anhydrous gallium chloride with a solvent to obtain a solution A, wherein, in the solution A, a concentrations of the copper nitrate trihydrate is 12 mM to 18 mM, a concentration of the aluminum nitrate nonahydrate is 4 mM to 7 mM, and concentrations of the anhydrous copper chloride and the anhydrous gallium chloride are both 1.5 mg/ml to 2.5 mg/ml;

S2: mixing sodium hydroxide with a solvent to obtain a solution B, wherein, in the solution B, a concentration of the sodium hydroxide is 0.05 g/mL to 0.15 g/mL; and S3: dropwise adding the solution A and the solution B into a reaction solvent at the same time, maintaining stable pH during the dropwise addition, stirring the mixture to fully react after the dropwise addition, filtering the mixture to collect a solid-phase filter residue after the reaction, and sequentially washing, drying and grinding the solid-phase filter residue into powder, so as to obtain the gallium-copper bimetallic monatomic nano-enzyme, wherein a ratio of a solvent volume of the solution A and a solvent volume of the solution B to a solvent volume of the reaction solvent is 1:1:2.

Preferably, the preparation method for the bimetallic monatomic nano-enzyme electrochemical sensor comprises the following steps:
- first step: printing a conductive silver paste screen in a middle portion of the flexible carrier, and curing the screen at 60° C. for 30 min to form the reference electrode;
- second step: printing a conductive carbon paste screen on one side of the flexible carrier, and curing the screen at 60° C. for 30 min to form the counter electrode;
- third step: mixing the gallium-copper bimetallic monatomic nano-enzyme with a conductive carbon paste according to a mass ratio of 1:1 to obtain a compound; and coating the compound on the other side of the flexible carrier, and curing the compound to form the working electrode;
- fourth step: printing a layer of insulating ink around the flexible carrier, and curing the ink at 60° C. for 20 min to obtain a bimetallic monatomic nano-enzyme electrochemical sensor chip; and
- fifth step: connecting the reference electrode, the counter electrode and the working electrode with the electric signal control device to construct the bimetallic monatomic nano-enzyme electrochemical sensor.

Preferably, according to the preparation method for the bimetallic monatomic nano-enzyme electrochemical sensor, the flexible carrier is polyethyleneimine.

The present disclosure further provides a bimetallic monatomic nano-enzyme electrochemical sensor obtained by the preparation method above.

The present disclosure further provides a detection method for a freshness of meat based on the bimetallic monatomic nano-enzyme electrochemical sensor above, which comprises the following steps:
- step A: preparing fresh meat sample solutions with different storage time, dropwise adding the fresh meat sample solutions onto an electrochemical sensor chip of the bimetallic monatomic nano-enzyme electrochemical sensor, carrying out an electrochemical experiment by chronoamperometry, recording corresponding steady-state current values, and drawing a regression curve of the storage time and the steady-state current values to obtain a first regression equation;
- step B: determining total volatile basic nitrogen contents in the fresh meat sample solutions with different storage time, and drawing a regression curve of the storage time and the total volatile basic nitrogen contents to obtain a second regression equation;
- step C: based on the first regression equation and the second regression equation, obtaining a regression curve of the steady-state current values and the total volatile basic nitrogen contents to obtain a third regression equation;
- step D: dropwise adding a fresh meat sample solution to be detected on the sensor chip of the bimetallic monatomic nano-enzyme electrochemical sensor to acquire a corresponding steady-state current value, and obtaining a corresponding total volatile basic nitrogen content based on the third regression equation; and step E: evaluating a freshness of fresh meat to be detected based on the corresponding total volatile basic nitrogen content obtained in the step D.

The present disclosure comprises at least the following beneficial effects:
1. In a catalytic reaction process, gallium needs to overcome lower energy than that of other metals, and the reaction is easier; according to the present invention, gallium and copper are combined to form the bimetallic nano-enzyme material, and a synergistic effect of gallium and copper is utilized to greatly improve an electron transmission performance in the catalytic reaction process, so that the detection sensitivity of the electrochemical sensor is improved; and the gallium-copper bimetallic monatomic nano-enzyme material is synthesized by an eutectic precipitation method in the present invention, and the synthetic method of the material is simple and easy to operate, economical and environment-friendly.
2. The screen printing technology is used to load the gallium-copper bimetallic monatomic nano-enzyme material on the flexible polyethyleneimine carrier, so as to construct the bimetallic monatomic nano-enzyme electrochemical sensor, which has the advantages of fast detection speed, wide linear range, low detection limit, strong anti-interference, high sensitivity, low cost and simple operation.
3. The detection method for the freshness of fresh meat based on the bimetallic monatomic nano-enzyme electrochemical sensor provided by the present invention can realize rapid and portable qualitative and quantitative detection of the volatile amine generated in a process of meat spoilage on site, and compared with a large-scale instrument detection method, the detection method does not need complex sample pretreatment, large-scale equipment and professional detection personnel, and has high sensitivity.

Other advantages, objectives and features of the present disclosure will be partially reflected by the following description, and will be partially understood by those skilled in the art through researching and practicing the present disclosure.

DETAILED DESCRIPTION OF THE EMBODIMENTS

Figure 1:
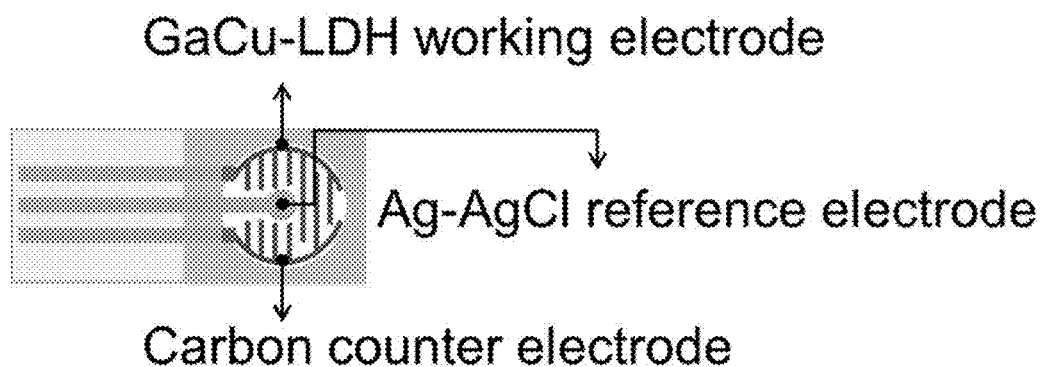
FIG. 1 is a structural diagram of a bimetallic monatomic nano-enzyme electrochemical sensor prepared in Embodiment 2 of the present disclosure.

The present disclosure is further described in detail hereinafter with reference to the drawings and embodiments, so that those skilled in the art are capable of implementing according to the text of the specification.

It should be understood that the terms such as "having," "including," and "comprising" as used herein do not exclude the presence or addition of one or more other elements or combinations thereof.

It should be noted that experimental methods described in the following embodiments are all conventional methods unless otherwise specified. All the reagents and materials can be obtained commercially unless otherwise specified.

The following embodiments are used to illustrate the present disclosure, and are not intended to limit the scope of the present disclosure. Specific technologies or conditions not indicated in the embodiments should follow the technologies or conditions described in the literature in the art or the product specification.

In the following embodiments, the instruments and devices used without indicating the manufacturers are all conventional products that can be purchased through regular channels. Unless otherwise specified, the methods are all conventional methods, and unless otherwise specified, the raw materials can all be obtained through open commercial channels.

The present disclosure provides a preparation method for a bimetallic monatomic nano-enzyme electrochemical sensor, wherein the bimetallic monatomic nano-enzyme electrochemical sensor comprises a working electrode, a counter electrode, a reference electrode and an electric signal control device; and the working electrode is formed by coating a gallium-copper bimetallic monatomic nano-enzyme and a conductive carbon paste on a flexible carrier; and a synthetic method for the gallium-copper bimetallic monatomic nano-enzyme specifically comprises the following steps:

S1: mixing copper nitrate trihydrate, aluminum nitrate nonahydrate, anhydrous copper chloride and anhydrous gallium chloride with a solvent to obtain a solution A, wherein, in the solution A, a concentrations of the copper nitrate trihydrate is 12 mM to 18 mM, a concentration of the aluminum nitrate nonahydrate is 4 mM to 7 mM, and concentrations of the anhydrous copper chloride and the anhydrous gallium chloride are both 1.5 mg/ml to 2.5 mg/mL;

S2: mixing sodium hydroxide with a solvent to obtain a solution B, wherein, in the solution B, a concentration of the sodium hydroxide is 0.05 g/mL to 0.15 g/mL; and S3: dropwise adding the solution A and the solution B into a reaction solvent at the same time, maintaining stable pH during the dropwise addition, stirring the mixture to react for 14 hours to 20 hours after the dropwise addition, filtering the mixture to collect a solid-phase filter residue after the reaction, and sequentially washing, drying and grinding the solid-phase filter residue into powder, so as to obtain the gallium-copper bimetallic monoatomic nano-enzyme, wherein a ratio of a solvent volume of the solution A and a solvent volume of the solution B to a solvent volume of the reaction solvent is 1:1:2.

The solvents used in the step S1 and the step S2 and the reaction solvent used in the step S3 are all ultrapure water.

In the step S3, the stable pH value is 8.4 to 8.6; in the step S3, the washing of the solid-phase filter residue specifically comprises washing the solid-phase filter residue with anhydrous ethanol and ultrapure water for several times; and the drying of the washed solid-phase filter residue is carried out at 50° C. to 70° C.

In another technical solution, the preparation method for the bimetallic monatomic nano-enzyme electrochemical sensor comprises the following steps:

first step: printing a conductive silver paste screen in a middle portion of the flexible carrier, and curing the screen at 60° C. for 30 minutes to form the reference electrode;

second step: printing a conductive carbon paste screen on one side of the flexible carrier, and curing the screen at 60° C. for 30 minutes to form the counter electrode;

third step: mixing the gallium-copper bimetallic monatomic nano-enzyme with a conductive carbon paste according to a mass ratio of 1:1 to obtain a compound; and coating the compound on the other side of the flexible carrier, and curing the compound to form the working electrode;

fourth step: printing a layer of insulating ink around the flexible carrier, and curing the ink at 60° C. for 20 minutes to obtain a bimetallic monatomic nano-enzyme electrochemical sensor chip; and fifth step: connecting the reference electrode, the counter electrode and the working electrode with the electric signal control device to construct the bimetallic monatomic nano-enzyme electrochemical sensor.

In another technical solution, according to the preparation method for the bimetallic monatomic nano-enzyme electrochemical sensor, the flexible carrier is polyethyleneimine.

The present disclosure further provides a bimetallic monatomic nano-enzyme electrochemical sensor obtained by the preparation method above.

The present disclosure further provides a detection method for a freshness of meat based on the bimetallic monatomic nano-enzyme electrochemical sensor above, which comprises the following steps:

step A: preparing fresh meat sample solutions with different storage time, dropwise adding the fresh meat sample solutions onto an electrochemical sensor chip of the bimetallic monatomic nano-enzyme electrochemical sensor, carrying out an electrochemical experiment by chronoamperometry, recording corresponding steady-state current values, and drawing a regression curve of the storage time and the steady-state current values to obtain a first regression equation;

step B: determining total volatile basic nitrogen contents in the fresh meat sample solutions with different storage time, and drawing a regression curve of the storage time and the total volatile basic nitrogen contents to obtain a second regression equation;

step C: based on the first regression equation and the second regression equation, obtaining a regression curve of the steady-state current values and the total volatile basic nitrogen contents to obtain a third regression equation;

step D: dropwise adding a fresh meat sample solution to be detected on the sensor chip of the bimetallic monatomic nano-enzyme electrochemical sensor to acquire a corresponding steady-state current value, and obtaining a corresponding total volatile basic nitrogen content based on the third regression equation; and step E: evaluating a freshness of fresh meat to be detected based on the corresponding total volatile basic nitrogen content obtained in the step D.

In actual detection, there are usually two storage conditions for meat: room temperature (25° C.) and refrigerator refrigeration (4° C.), so that this technology is further introduced in detail by taking the storage conditions of 25° C. and 4° C. as examples.

A correlation model between a steady-state current value of meat and a concentration of total volatile basic nitrogen in meat is constructed.

(1) Relationships between different storage time and corresponding steady-state current values are established: for example, at a storage temperature of 25° C., meat sample solutions stored for 0 hour, 6 hours, 12 hours, 18 hours, 24 hours, 30 hours, 36 hours, 42 hours and 48 hours respectively are respectively dropwise added onto an electrochemical sensor chip of the bimetallic monatomic nano-enzyme electrochemical sensor, an electrochemical experiment is carried out by chronoamperometry, currents are scanned, the corresponding steady-state current values are recorded, and a linear regression curve of the time and the steady-state current values is drawn by taking the storage time as an abscissa and the steady-state current values as an ordinate to obtain a standard curve of the storage time and the steady-state current values, so as to obtain a relational model formula of Y1=aX1, which is recorded as a first regression equation, wherein Y1 is a steady-state current value and X1 is storage time; and at a storage temperature of 4° C., meat sample solutions stored for 1 day, 3 days, 5 days, 7 days and 9 days respectively are prepared, other operations are the same as above, and a linear regression curve of the time and the steady-state current values at the storage temperature of 4° C. is drawn, and obtaining the corresponding regression equation.

(2) Relationships between different storage time and total volatile basic nitrogen contents are drawn: at a storage temperature of 25° C., meat sample solutions stored for 0 hour, 6 hours, 12 hours, 18 hours, 24 hours, 30 hours, 36 hours, 42 hours and 48 hours respectively are subjected to total volatile basic nitrogen content determination according to the national standard detection requirement GB 5009.228-2016, a linear regression curve of the storage time and the total volatile basic nitrogen contents is drawn by taking the storage time as an abscissa and the total volatile basic nitrogen (TVB-N) contents as an ordinate to obtain a regression curve of the storage time and the total volatile basic nitrogen contents, so as to obtain a relational model formula of Y2=aX2, which is recorded as a second regression equation, wherein Y2 is a total volatile basic nitrogen content and X2 is storage time; and operations are the same as above, a regression curve of the storage time and the total volatile basic nitrogen contents at a storage temperature of 4° C. is drawn, and obtaining the corresponding regression equation.

(3) Relationships between the steady-state current values and the total volatile basic nitrogen contents are established: at a storage temperature of 25° C., a linear regression curve of the steady-state current values and the total volatile basic nitrogen contents at the storage temperature of 25° C. is drawn by taking the steady-state current values as an abscissa and the total volatile basic nitrogen contents as an ordinate based on the first linear regression equation and the second regression equation to obtain a regression curve of the steady-state current values and the total volatile basic nitrogen contents, so as to obtain a correlation model formula of Y=ax, which is recorded as a third regression equation, wherein Y is a volatile basic nitrogen content and X is a steady-state current value; and operations are the same as above, a regression curve of the steady-state current values and the total volatile basic nitrogen contents at a storage temperature of 4° C. is drawn, and obtaining the corresponding regression equation.

About 5 g of the meat sample to be detected stored at room temperature (25° C.) or in a refrigerator (4° C.) is ultrasonically processed with 25 mL of ultrapure water for 30 minutes, and centrifuged to collect a supernatant. 50 μL to 150 μL of the supernatant is dropwise added onto the gallium-copper bimetallic monatomic nano-enzyme electrochemical chip sensor (the preparation method of the above meat sample solution is the same as this method), a steady-state current value is measured, and a total volatile basic nitrogen content corresponding to the meat to be detected is acquired based on the correlation model (under the same storage condition).

In order to meet the requirements of rapid, efficient, portable and nondestructive food detection, the present disclosure provides a bimetallic monatomic nano-enzyme electrochemical sensor, and a preparation method therefor and an application thereof for rapid and efficient detection of volatile amine in a freshness index of fresh meat.

In the whole detection process, the gallium-copper bimetallic monatomic nano-enzyme is synthesized by a coprecipitation method first, and the gallium-copper bimetallic monatomic nano-enzyme electrochemical chip sensor is prepared and synthesized based on a screen printing technology; and sample solutions of pork, beef, mutton and chicken are dropwise added onto the electrochemical sensor chip, an electrochemical experiment is carried out by chronoamperometry, a change of freshness is quantitatively judged by observing a change of the steady-state current value, and the correlation model of the steady-state current value and the total volatile basic nitrogen content is established at the same time, so as to realize reliable quantitative signal output detection.

1. Experimental Materials

Anhydrous copper chloride ($CuCl_2$, analytical grade, 98%), anhydrous gallium chloride ($GaCl_3$, analytical grade, 98%) and ammonia (AA, analytical grade, 98%) are purchased from Shanghai Macklin Biochemical Technology Co., Ltd. Aluminum nitrate ($Al(NO_3)_3$, analytical grade, 98%) is purchased from China National Pharmaceutical Group Co., Ltd. Cadaverine (Cad, analytical grade, 98%) is obtained from Beijing Guangda Hengyi Technology Co., Ltd. Histamine (His, analytical grade, 98%), spermine (Spe, analytical grade, 98%) and putrescine (Put, analytical grade, 98%) are purchased from Beijing Baikai Biotechnology Co., Ltd. Tryptamine (Try, analytical grade, 98%) is purchased from Beijing Solarbio Science & Technology Co., Ltd. Phenylethylamine (PEA, analytical grade, 98%) is purchased from Beijing Nuochuang Chemistry Technology Co., Ltd. Ultrapure water (18.2 MΩ, Millipore) is used to prepare an aqueous solution in all experiments. Portable electrochemical workstations (length×width×height=45 mm×21 mm×4 mm, 19.1262 g) are purchased from Shenzhen Refresh Biosensing Technology Co., Ltd. Electrochemical sensor chips (length×width×height=7 mm×4 mm×0.25 mm, 0.1461 g) are obtained from Weihai Boteng Technology Co., Ltd. Pork, beef, mutton and chicken are all purchased from local supermarkets.

Embodiment 1

Synthesis of Gallium-Copper Bimetallic Monatomic Nano-Enzyme

In S1, copper nitrate trihydrate ($Cu(NO_3)_2 \cdot 3H_2O$), aluminum nitrate nonahydrate ($Al(NO_3)_3 \cdot 9H_2O$), 40 mg of anhydrous copper chloride ($CuCl_2$) and 40 mg of anhydrous gallium chloride ($GaCl_3$) were dissolved in 20 mL of ultrapure water to obtain a solution A, wherein, in the solution A, a concentration of the copper nitrate trihydrate was 16 mM, and a concentration of the aluminum nitrate nonahydrate was 5.33 mM.

In S2, 1.366 g of NaOH (sodium hydroxide) was dissolved in 20 ml of ultrapure water to obtain a solution B.

In S3, the solution A and the solution B were dropwise added into 40 ml of ultrapure water at the same time, stable pH 8.6 was maintained during the dropwise addition (the pH was controlled by adjusting dropwise adding speeds of the solution A and the solution B respectively), the mixture was stirred to react at room temperature for 16 hours after the dropwise addition of one solution (any one of the solution A and the solution B), then the reaction was stopped, the reaction solution was filtered in a centrifuge with a rotating speed of 8000 r/min for 5 minutes to collect a solid-phase filter residue, the solid-phase filter residue was washed with anhydrous ethanol twice, with 10 ml of anhydrous ethanol for washing each time, and then the solid-phase filter residue was washed with ultrapure water twice, with 10 ml of ultrapure water for washing each time, dried at 60° C., and then ground into powder, so as to obtain the gallium-copper bimetallic monatomic nano-enzyme.

Embodiment 2

Preparation of Gallium-Copper Bimetallic Monatomic Nano-Enzyme Electrochemical Sensor In A, a conductive silver paste (silver/silver chloride, model: AG-7) was printed in a middle portion of a flexible polyethyleneimine (PEI) carrier by a screen printing technology, and cured at 60° C. for 30 minutes to form a reference electrode.

A specific manufacturing method of the reference electrode could be realized by the existing technical means, for example: a 200-mesh silk-screen printing plate was adopted, a scraper pressure was set as 3 N, 5 μL of conductive silver paste (silver/silver chloride, model: AG-7) was printed to a middle portion of a flexible polyethylene imine (PEI) carrier, and a printing area was a circle with a diameter of 2 mm. After printing, the printed paste was cured at 60° C. for 30 minutes to form the reference electrode.

In B, a conductive carbon paste (model: TC-205) was printed on one side of the flexible polyethyleneimine (PEI) carrier by the screen printing technology, and cured at 60° C. for 30 minutes to form a counter electrode.

A specific manufacturing method of the control electrode could be realized by the existing technical means, for example: the same silk-screen printing device was adopted, 8 μL of conductive carbon paste (model: TC-205) was printed to one side of the PEI carrier, and a printing area was a circle with a diameter of 3 mm. After printing, the printed paste was cured at 60° C. for 30 min to form the control electrode.

In C, synthesized gallium-copper bimetallic monatomic nano-enzyme solid powder and the conductive carbon paste were mixed according to a mass ratio of 1:1 to prepare a compound; and the compound was coated on the other side of the flexible polyethyleneimine (PEI) carrier, and cured at 60° C. for 30 minutes to form a working electrode.

A specific manufacturing method of the working electrode could be realized by the existing technical means, for example: the synthesized gallium-copper bimetallic monatomic nano-enzyme solid powder was mixed with the conductive carbon paste according to the mass ratio of 1:1 to prepare the compound (total mass 2 mg). 5 μL of compound suspension (containing 2 mg of compound) was dropwise coated on a circular area (diameter 4 mm) on the other side of the PEI carrier with a micropipette, uniformly scrapped with a glass rod to a thickness of about 15 μm, and cured at 60° C. for 30 minutes to form the working electrode;

In D, a layer of insulating ink (model: LCN-D2) was printed around the PEI carrier, and cured at 60° C. for 20 minutes to obtain an electrochemical sensor chip, wherein overall length, width and height of the chip were 7 mm×4 mm×0.25 mm respectively. A diameter of a circular area was 4 mm, a weight was 0.1461 g, and a loading capacity of the compound was 2 mg.

A specific manufacturing method of the electrochemical sensor chip could be realized by the existing technical means, for example: insulating ink (model: LCN-D2) with a thickness of 0.25 mm was printed around the PEI carrier by a silk-screen printing technology, and a printing area was an area excluding a circular electrode working area with a diameter of 4 mm (comprising the reference electrode, the control electrode and the working electrode). After printing, the printed insulating ink was cured at 60° C. for 20 minutes to prepare the electrochemical sensor chip. The final chip had a size of 7 mm×4 mm×0.25 mm and a weight of 0.1461 g, and the loading capacity of the working electrode compound was 2 mg.

In E, the reference electrode, the counter electrode and the working electrode were connected with an electric signal control device (electrochemical workstation) to construct the bimetallic monatomic nano-enzyme electrochemical sensor. In the present application, the electrochemical chip sensor was constructed by the screen printing technology, as shown in FIG. 1, and an electrochemical detection platform was integrated with the portable electrochemical workstation.

In the following experimental examples, data analysis was carried out by Origin software.

First Experimental Example

Figure 2:
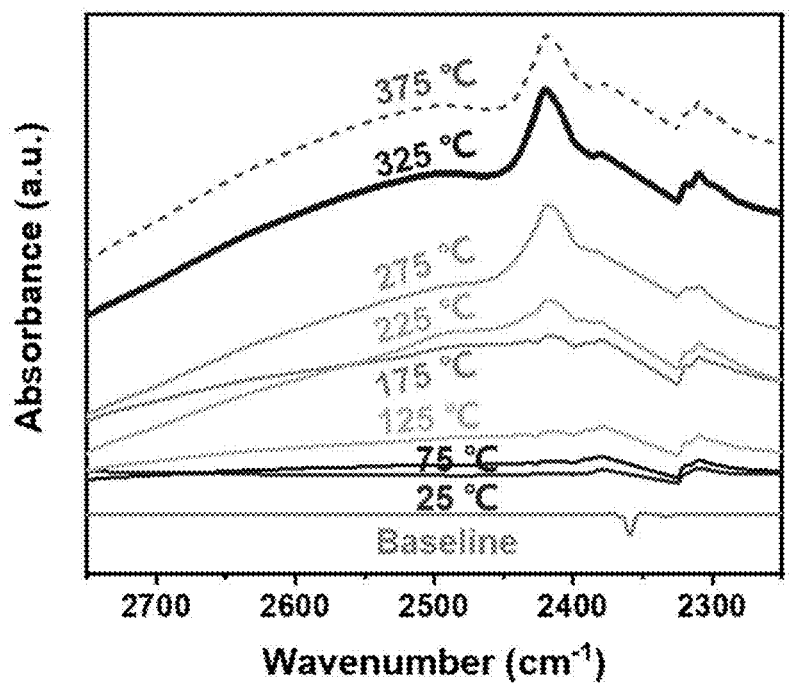
FIG. 2 is a schematic diagram of adsorption reaction relationships between a gallium-copper bimetallic monatomic nano-enzyme and ammonia water at different temperatures in First Experimental Example of the present disclosure.

Interaction Relationship Between Gallium-Copper Bimetallic Monatomic Nano-Enzyme and Volatile Amine In order to explore the interaction relationship between the gallium-copper bimetallic monatomic nano-enzyme and the volatile amine, first, ammonia water was used as a representative to explore adsorption reaction relationships between a gallium-copper bimetallic monatomic nano-enzyme material and ammonia water at different temperatures by in-situ Fourier transform spectroscopy in the present application, and results were as shown in FIG. 2. It could be seen from FIG. 2 that, with the increase of temperature, a gallium-copper bimetallic monoatomic nano-enzyme in-situ system produced an obvious absorption peak at 2425 $cm^{-1}$ at 225° C., and a maximum peak value was reached with the further increase of temperature to 325° C., indicating that an adsorption binding capacity between the ammonia water and the gallium-copper bimetallic monoatomic nano-enzyme was larger. With the increase of temperature to 375° C., the peak value of the in-situ system at 2425 $cm^{-1}$ showed an obvious decrease trend, indicating that a desorption reaction began to occur between the ammonia water and the gallium-copper bimetallic monatomic nano-enzyme. Therefore, there was adsorption between the gallium-copper bimetallic monatomic nano-enzyme prepared by the present disclosure and the volatile amine.

Second Experimental Example

Optimization of Detection Parameters of Bimetallic Monatomic Nano-Enzyme Electrochemical Chip Sensor Ammonia water was used as a detection object to optimize a sensing performance of the bimetallic monatomic nano-enzyme electrochemical sensor. Specifically, the ammonia water was dropwise added onto a bimetallic monatomic nano-enzyme electrochemical sensor chip, an electrochemical experiment was carried out by chronoamperometry, and a steady-state current value was recorded.

Figure 3:
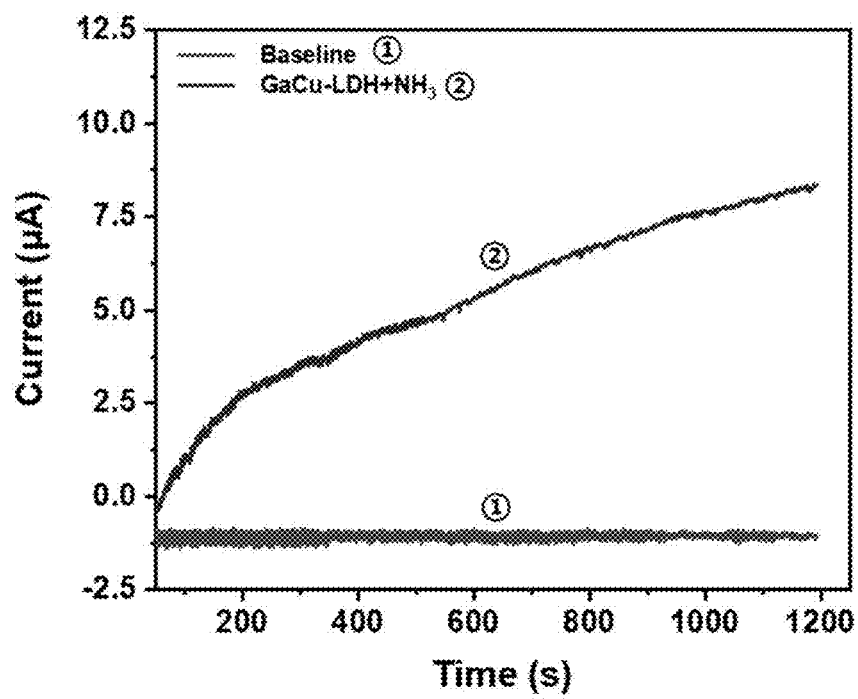
FIG. 3 is a schematic diagram of a current-time curve of a gallium-copper bimetallic monatomic nano-enzyme electrochemical sensor to ammonia water in Second Experimental Example of the present disclosure.
Figure 4:
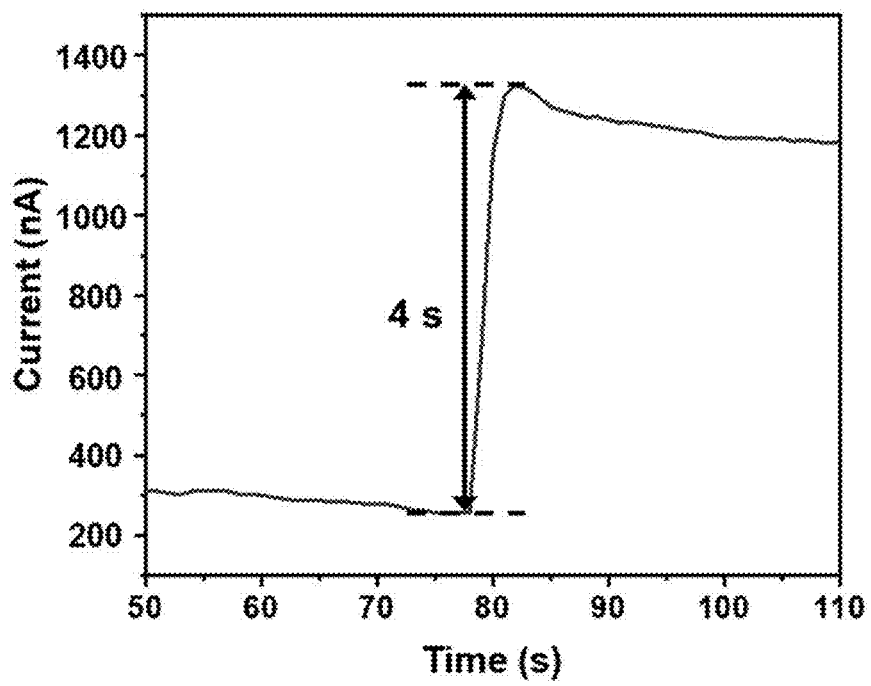
FIG. 4 is a schematic diagram of response time of the gallium-copper bimetallic monatomic nano-enzyme electrochemical sensor to the ammonia water in Second Experimental Example of the present disclosure.

0.2 mM ammonia water was dropwise added onto a sensor chip of the bimetallic monatomic nano-enzyme electrochemical sensor, and scanned current diagrams were as shown in FIG. 3 to FIG. 4. It could be seen from FIG. 3 to FIG. 4 that a current-time (I-t) curve of the bimetallic monatomic nano-enzyme electrochemical sensor chip after contacting with the 0.2 mM ammonia water solution changed obviously (FIG. 3) compared with a control group (baseline) (the control group specifically referred to dropwise adding the same amount of ultrapure water onto the chip), indicating that the bimetallic monatomic nano-enzyme electrochemical sensor chip had a good signal response to the ammonia water, with response time of about 4 seconds (FIG. 4).

Figure 5:
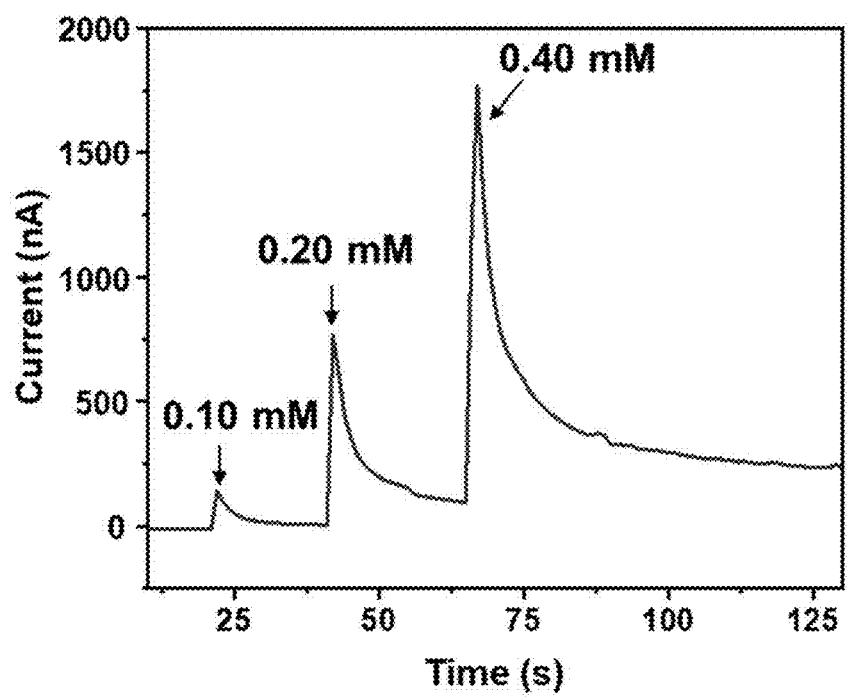
FIG. 5 is a schematic diagram of response signal results of the gallium-copper bimetallic monatomic nano-enzyme electrochemical sensor to the ammonia water at different concentrations in Second Experimental Example of the present disclosure.

Different concentrations (0.1 mM, 0.2 mM and 0.4 mM) of ammonia water were set and respectively used for the electrochemical experiment of the gallium-copper bimetallic monatomic nano-enzyme electrochemical sensor, and corresponding steady-state current values were recorded, as shown in FIG. 5. It could be seen from FIG. 5 that, with the increase of concentration of the ammonia water, the response signal was also enhanced.

Figure 6:
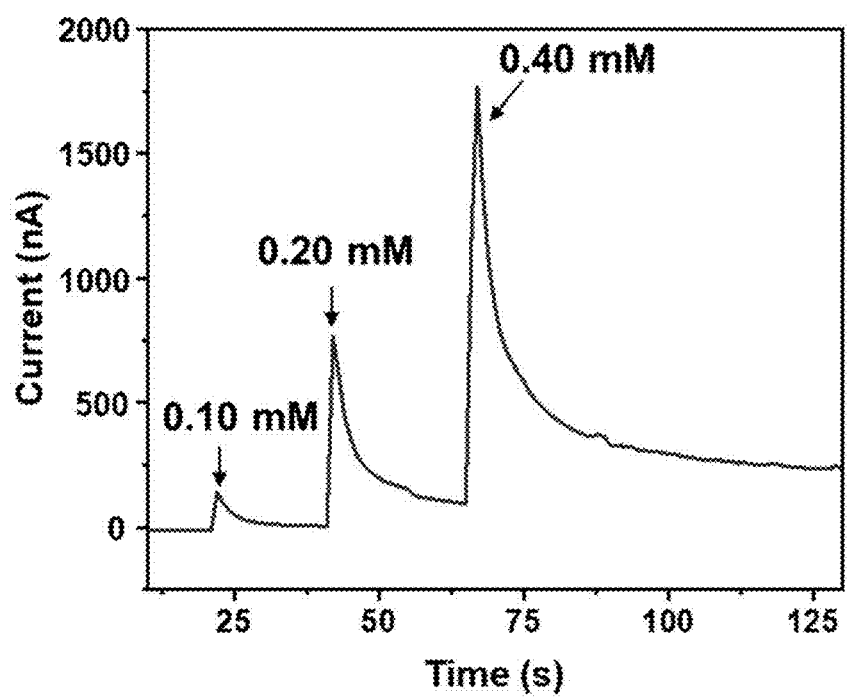
FIG. 6 is a schematic diagram of correlation results between different pH values and a steady-state current value of the gallium-copper bimetallic monatomic nano-enzyme electrochemical sensor responding to the ammonia water in Second Experimental Example of the present disclosure.
Figure 7:
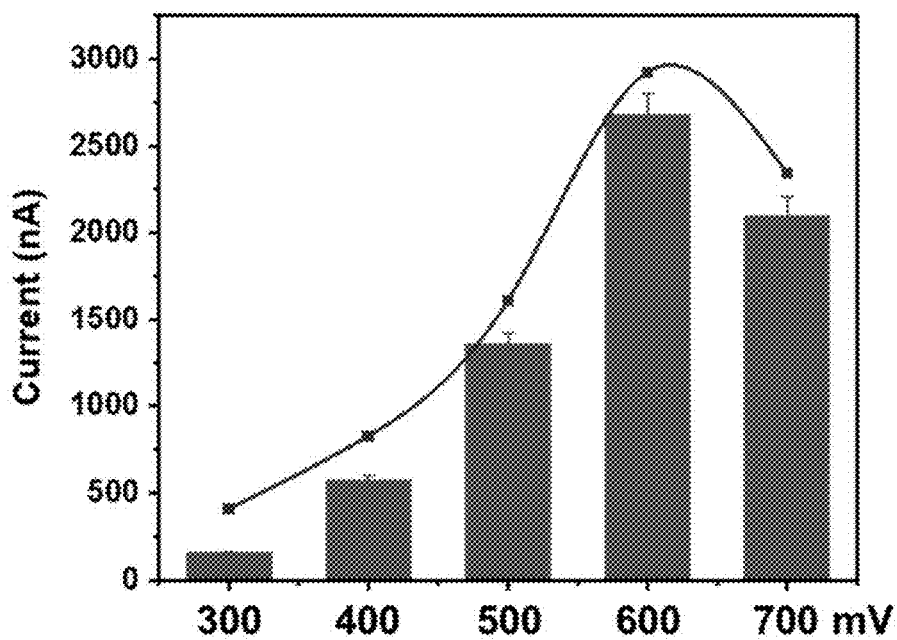
FIG. 7 is a schematic diagram of correlation results between different potentials and the steady-state current value of the gallium-copper bimetallic monatomic nano-enzyme electrochemical sensor responding to the ammonia water in Second Experimental Example of the present disclosure.

The ammonia water (at an ammonia water concentration of 0.2 mM) was used to optimize detection conditions comprising a pH value and a potential, experiments with different pH values (2.0, 4.0, 6.0, 8.0 and 12.0) and potentials (300 mV, 400 mV, 500 mV, 600 mV and 700 mV) were set respectively, corresponding steady-state current values were recorded, correlation results between different pH values and the steady-state current values were as shown in FIG. 6, and correlation results between different potentials and the steady-state current values were as shown in FIG. 7. It could be seen from FIG. 6 to FIG. 7 that the best response of the bimetallic monatomic nano-enzyme electrochemical sensor to the ammonia water was achieved when the pH value was 4.0 and the potential was 600 mV.

Third Experimental Example

Figure 8:
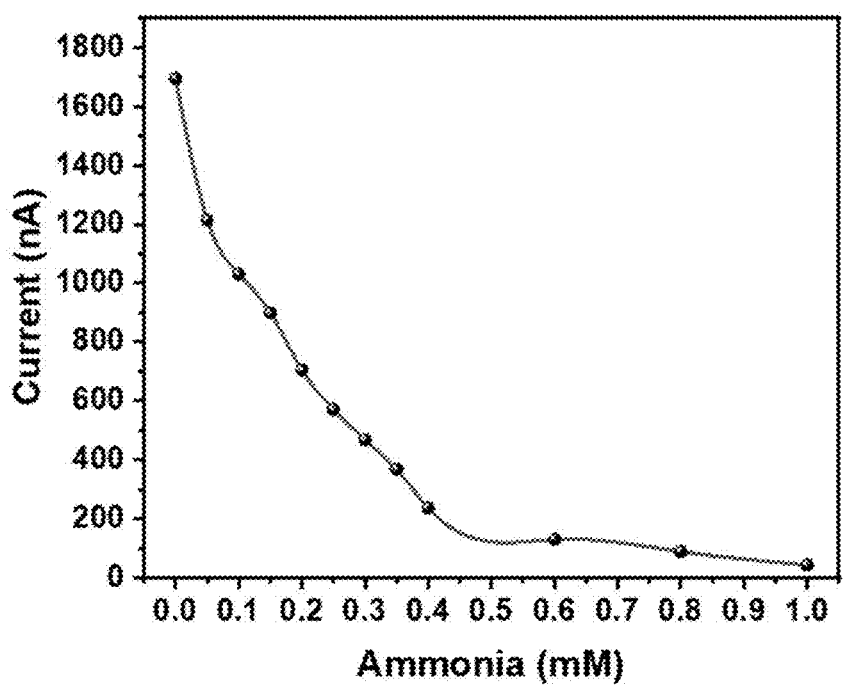
FIG. 8 is a schematic diagram of response relationship results between an ammonia water concentration and a steady-state current value in Third Experimental Example of the present disclosure.
Figure 9:
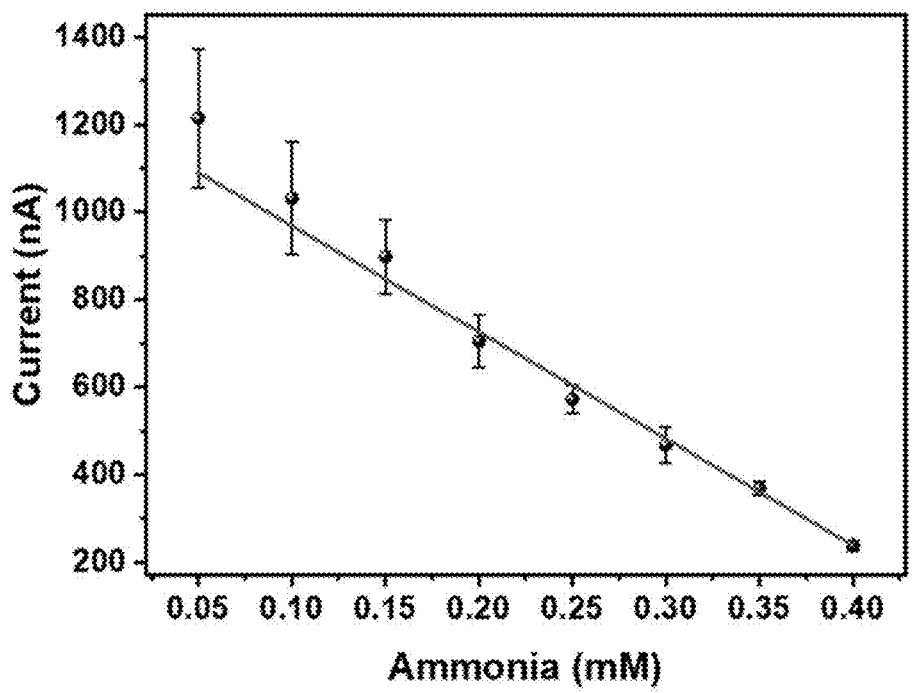
FIG. 9 is a schematic diagram of linear relationship results between the ammonia water concentration and the steady-state current in Third Experimental Example of the present disclosure.

Sensitivity Detection Test of Bimetallic Monatomic Nano-Enzyme Electrochemical Sensor Taking ammonia water as an example, under the above optimized detection conditions (pH=4.0, potential 600 mV), a sensitivity response experiment of the bimetallic monatomic nano-enzyme electrochemical sensor to volatile amine was carried out, and a response relationship between an ammonia water concentration and a steady-state current value was established in a linear range of ammonia water concentration of 0.05 mM to 1 mM, as shown in FIG. 8. In a range of 0.05 mM to 0.40 mM, there was a good linear relationship between the ammonia water concentration and the steady-state current, as shown in FIG. 9, wherein a decision coefficient was $R^2=0.9906$, a correlation coefficient was R=0.9953, and a detection limit was 5.9 μM.

Fourth Experimental Example

Figure 10:
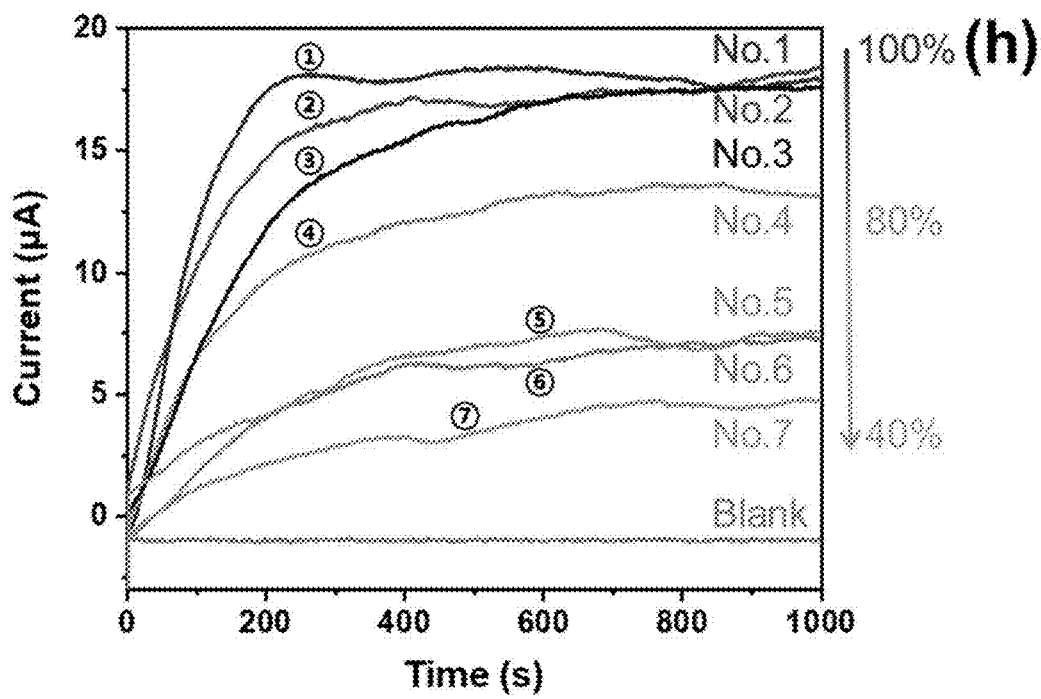
FIG. 10 is a schematic diagram of test results of repeated use of a gallium-copper bimetallic monatomic nano-enzyme electrochemical sensor in Fourth Experimental Example of the present disclosure.

Repeatability and Stability Tests of Bimetallic Monatomic Nano-Enzyme Electrochemical Sensor Under detection conditions comprising an ammonia water concentration of 0.2 mM, pH=4.0 and a potential of 600 mV, a detection activity of the bimetallic monatomic nano-enzyme electrochemical sensor in repeated use was tested. After each scanning, bimetallic monatomic nano-enzyme electrochemical sensor chip was activated: specifically, 100

μL of 0.01 μM standard hydrochloric acid solution was dropwise added onto the bimetallic monatomic nano-enzyme electrochemical sensor chip and allowed to stand for 2 minutes, wiped with absorbent paper, then dropwise added with 100 μL of ultrapure water and allowed to stand for 2 minutes, and wiped with absorbent paper, the operation was repeated twice for the next detection, a corresponding current scanning diagram for each detection was recorded, and the relative activity [relative activity=(steady-state current value of first scanning-steady-state current value of current scanning)/steady-state current value of first scanning× 100%] was calculated. Result was as shown in FIG. 10 (in FIG. 10, No. 1 to No. 7 referred to that a number of times of repeated use was 1 to 7 respectively, and the blank referred to a reference of a control group). It could be seen from FIG. 10 that the activity could still reach 80% after the sensor chip was repeatedly used for four times.

Figure 11:
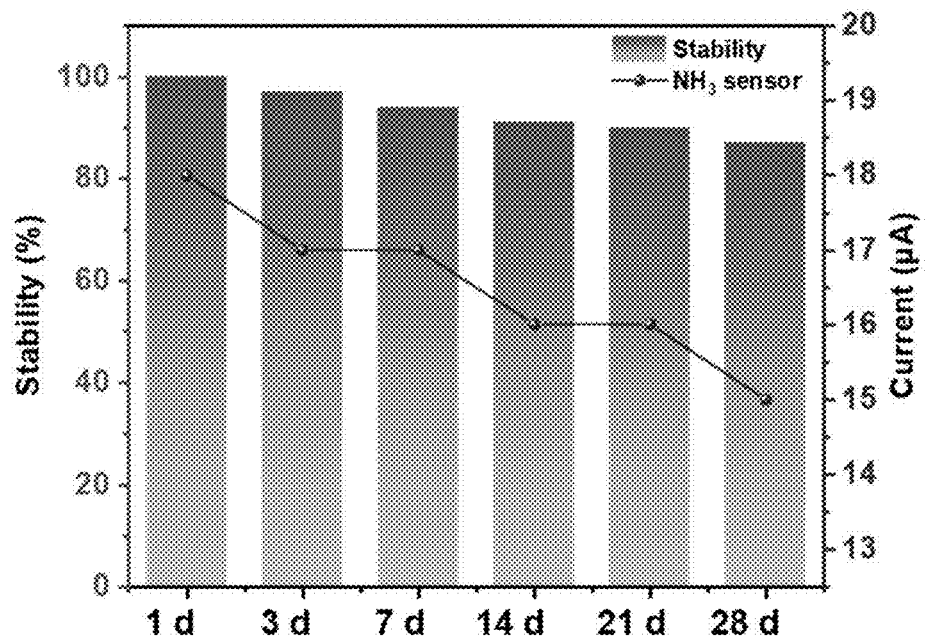
FIG. 11 is a schematic diagram of test results of different storage time of the gallium-copper bimetallic monatomic nano-enzyme electrochemical sensor in Fourth Experimental Example of the present disclosure.

Similarly, under the detection conditions comprising the ammonia water concentration of 0.2 mM, the pH=4.0 and the potential of 600 mV, the detection activity of the bimetallic monatomic nano-enzyme electrochemical sensor with different storage time (1 day, 3 days, 7 days, 14 days, 21 days and 28 days) was tested, and results were as shown in FIG. 11. It could be seen from FIG. 11 that the activity could still be maintained at 60% or above after one-week storage at room temperature.

Fifth Experimental Example

Anti-Interference Test of Gallium-Copper Bimetallic Monatomic Nano-Enzyme Electrochemical Sensor Solutions of $Na^+$(NaCl), $K^+$(KCl), $Cl^-$(NaCl), $NO_3^-$ ($NaNO_3$), $SO_4^{2-}$($Na_2SO_4$), urea, glucose, methionine, lysine, vitamin E, hydrogen sulfide, ammonia water, cadaverine, histamine, putrescine, tryptamine and phenylethylamine at a concentration of 0.25 mM were prepared by taking ultrapure water as a solvent, and a mixed solution of the above solutions (the concentration of each substance above was 0.25 mM) were respectively prepared.

Figure 12:
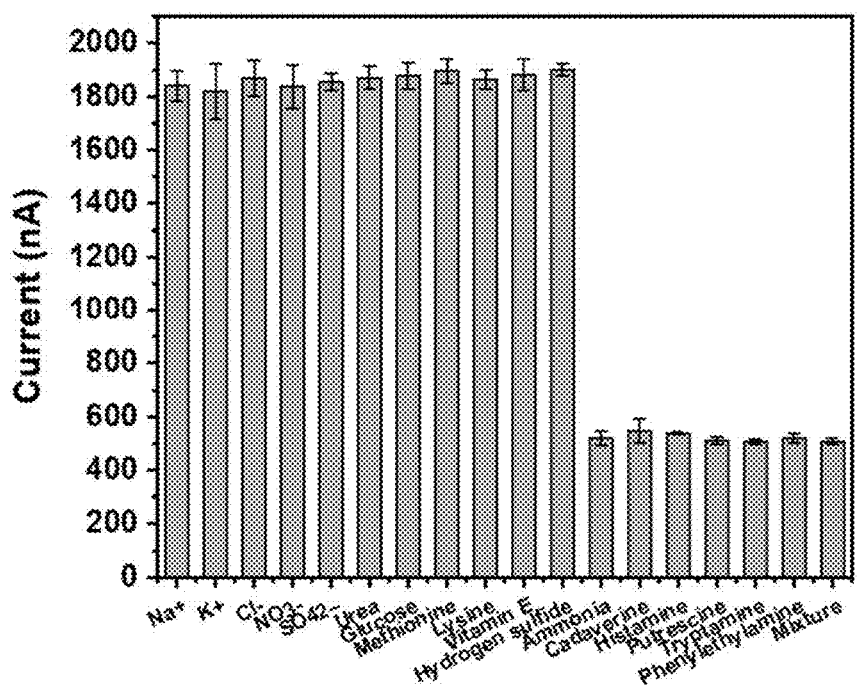
FIG. 12 is a schematic diagram of test results of anti-interference performance of a gallium-copper bimetallic monatomic nano-enzyme electrochemical sensor in Fifth Experimental Example of the present disclosure.

Under detection conditions comprising pH=4.0 and a potential of 600 mV, 100 μL of the above solution was dropwise added onto the gallium-copper bimetallic monatomic nano-enzyme electrochemical sensor chip, corresponding steady-state current values of the solutions were recorded respectively, and specific results were as shown in FIG. 12. It could be seen from FIG. 12 that the bimetallic monatomic nano-enzyme electrochemical sensor provided by the resent invention had a good anti-interference performance.

Sixth Experimental Example

Figure 13:
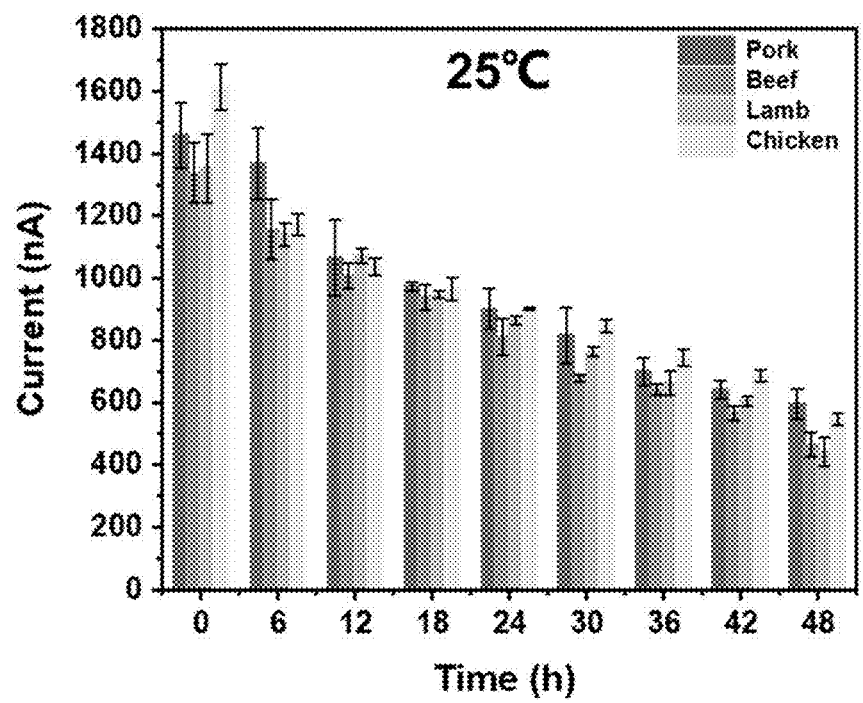
FIG. 13 is a schematic diagram of statistical results of steady-state current values of pork, beef, mutton and chicken in different time periods under a storage condition of 25° C. by a gallium-copper bimetallic monatomic nano-enzyme electrochemical sensor in Sixth Experimental Example of the present disclosure.
Figure 14:
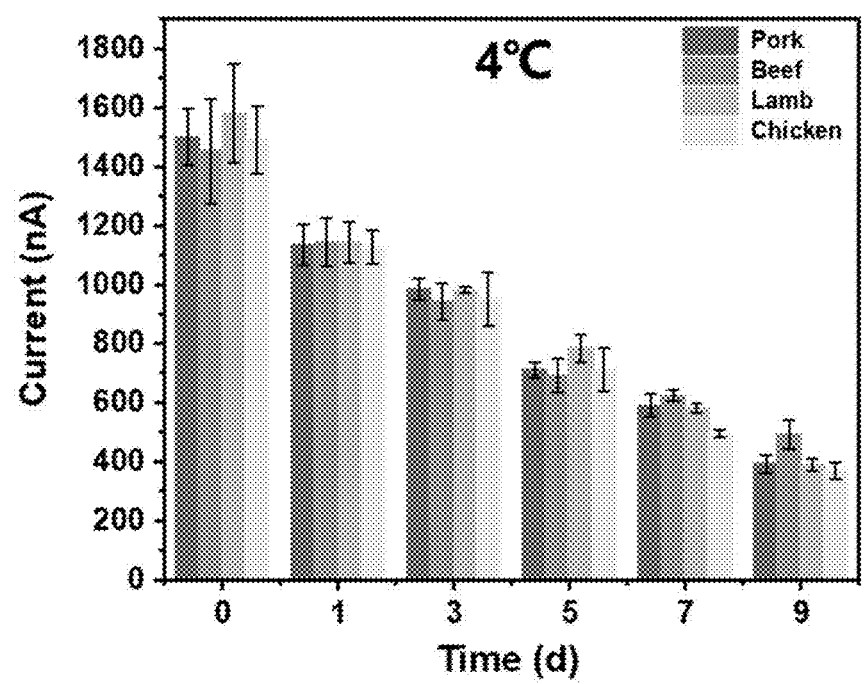
FIG. 14 is a schematic diagram of statistical results of steady-state current values of pork, beef, mutton and chicken in different time periods under a storage condition of 4° C. by the gallium-copper bimetallic monatomic nano-enzyme electrochemical sensor in Sixth Experimental Example of the present disclosure.

Quantitative Detection of Freshness of Livestock and Poultry Meat by Bimetallic Monatomic Nano-Enzyme Electrochemical Sensor Livestock meat (pork, beef and mutton) and poultry meat (chicken) were selected for actual sample detection, which were cut into pieces of about 80 g, and stored in commercially available new boxes at 25° C. (for 0 hour, 6 hours, 12 hours, 18 hours, 24 hours, 30 hours, 36 hours, 42 hours and 48 hours) and 4° C. (for 0 day, 1 day, 3 days, 5 days, 7 days and 9 days) respectively. Meat samples were taken at different time points, and about 5 g of each sample was taken, processed with 25 mL of ultrapure water for 30 minutes, and centrifuged to collect a supernatant. 100 μL of the supernatant was dropwise added onto the gallium-copper bimetallic monatomic nano-enzyme electrochemical chip sensor to measure a steady-state current value, and results were as shown in FIG. 13 and FIG. 14. In this experiment, volatile amine contents of pork, beef, mutton and chicken stored at 25° C. and 4° C. were detected at different time points by using an excellent sensing performance of the bimetallic monatomic nano-enzyme electrochemical sensor, so as to evaluate the freshness of meat. It could be seen from FIG. 13 and FIG. 14 that, with the extension of storage time, the steady-state current value of the bimetallic monatomic nano-enzyme electrochemical sensor was decreased accordingly.

Figure 15:
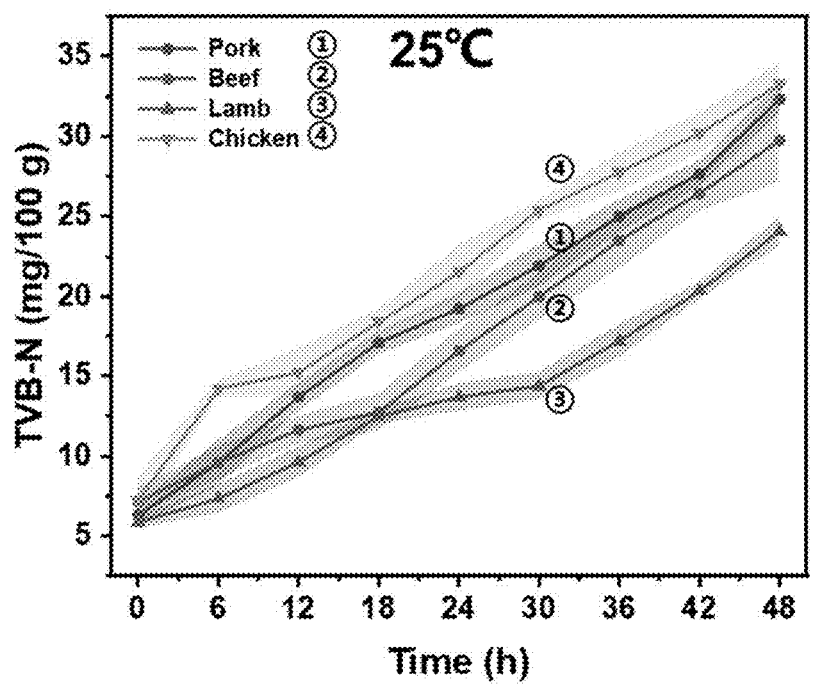
FIG. 15 is a schematic diagram of statistical results of total volatile basic nitrogen (TVB-N) values of pork, beef, mutton and chicken in different time periods under a storage condition of 25° C. in Sixth Experimental Example of the present disclosure.
Figure 16:
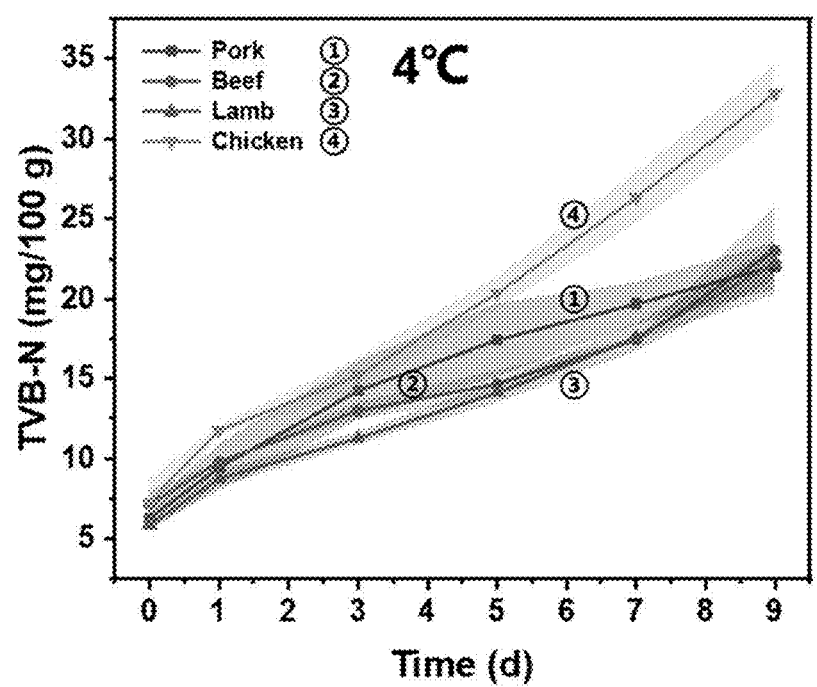
FIG. 16 is a schematic diagram of statistical results of total volatile basic nitrogen (TVB-N) values of pork, beef, mutton and chicken in different time periods under a storage condition of 4° C. in Sixth Experimental Example of the present disclosure.

In order to verify the reliability of the detection results, total volatile basic nitrogen (TVB-N) values of pork, beef, mutton and chicken samples stored at 25° C. and 4° C. for different storage time were detected according to a national standard method (GB 5009.228-2016, GB 2707-2016), and results were as shown in FIG. 15 to FIG. 16. According to the requirements of GB 5009.228-2016 standard, when the TVB-N content in fresh meat exceeded 15 mg/100 g, it was judged that the meat went bad. It could be seen from FIG. 15 that, at the storage temperature of 25° C., spoilage time of pork, beef, mutton and chicken was 18 hours, 24 hours, 36 hours and 12 hours respectively. It could be seen from FIG. 16 that, at the storage temperature of 4° C., spoilage time of pork, beef, mutton and chicken was 5 days, 7 days, 7 days and 3 days respectively.

Figure 17:
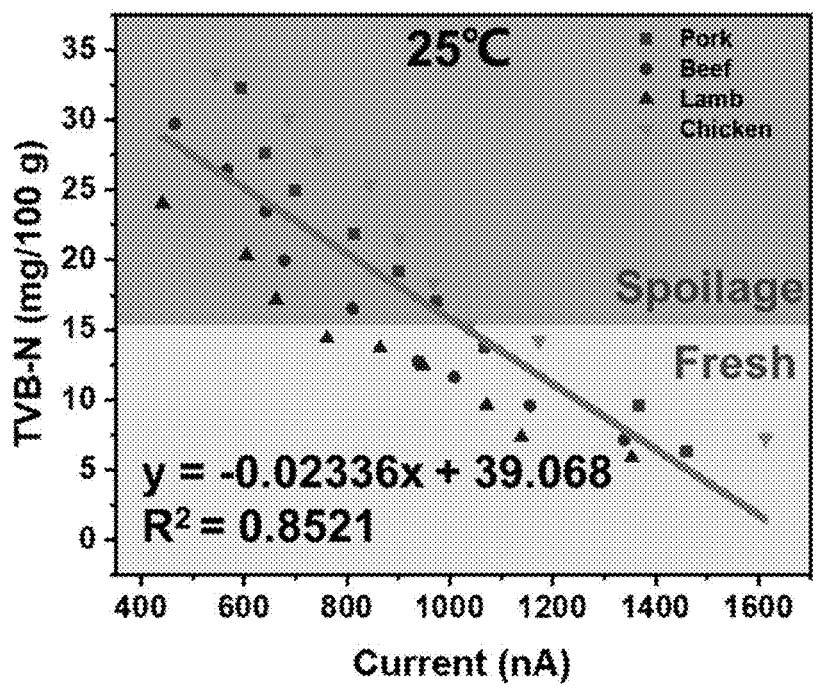
FIG. 17 is a schematic diagram of correlation results between the steady-state current values and total volatile basic nitrogen (TVB-N) values of pork, beef, mutton and chicken under the storage condition of 25° C. in Sixth Experimental Example of the present disclosure.

Further, according to the above results, a response relationship between the steady-state current value and the TVB-N value of each meat was established. At the storage temperature of 25° C., there were good linear relationships between the detected steady-state current values of pork, beef, mutton and chicken and the TVB-N at different storage time points, as shown in FIG. 17, wherein a decision coefficient was $R^2$=0.8521, and a correlation coefficient was R=0.9231.

Figure 18:
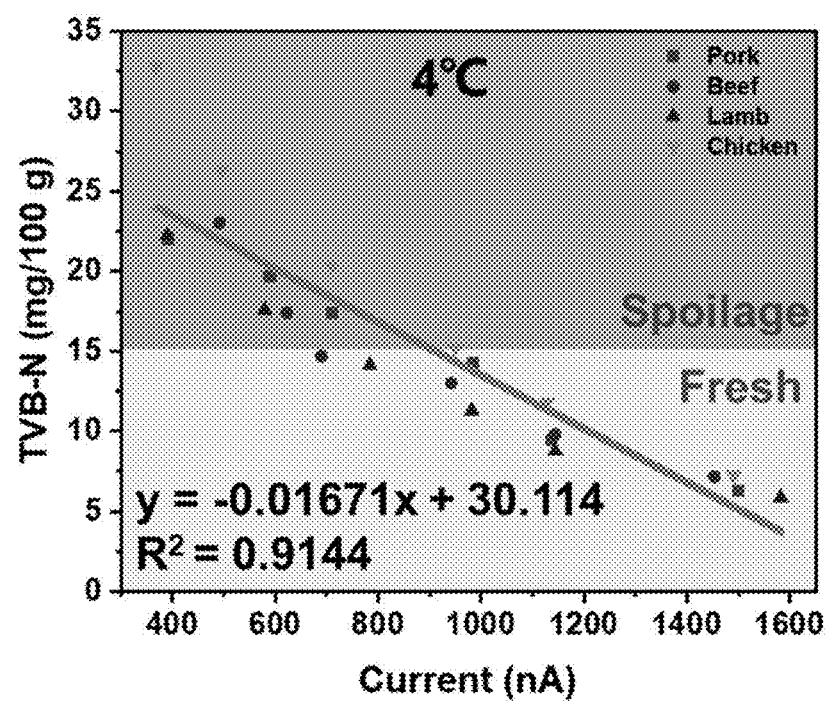
FIG. 18 is a schematic diagram of correlation results between the steady-state current values and total volatile basic nitrogen (TVB-N) values of pork, beef, mutton and chicken under the storage condition of 4° C. in Sixth Experimental Example of the present disclosure.

At the storage temperature of 4° C., there were also good linear relationships between the detected steady-state current values of pork, beef, mutton and chicken and the TVB-N at different storage time points, as shown in FIG. 18, wherein a decision coefficient was $R^2$=0.9144, and a correlation coefficient was R=0.9562.

To sum up, the bimetallic monatomic nano-enzyme electrochemical sensor constructed by the present disclosure can realize reliable freshness detection and monitoring of fresh livestock and poultry meat stored under normal temperature (25° C.) and refrigeration (4° C.) conditions.

The equipment quantity and the processing scale described herein are used to simplify the description of the present disclosure. The application, modification and variation of the present disclosure are obvious to those skilled in the art.

Although the implementation of the present disclosure has been disclosed above, it is not limited to the applications listed in the specification and the embodiments, and can be fully applied to various fields suitable for the present disclosure, and additional modifications can be easily implemented by those skilled in the art. Therefore, the present disclosure is not limited to the specific details and illustrations shown and described herein without departing from the general concept defined by the claims and the equivalent scope.

The invention claimed is:

1. A preparation method for a bimetallic monatomic nano-enzyme electrochemical sensor, wherein the bimetallic monatomic nano-enzyme electrochemical sensor consists of a working electrode, a counter electrode, a reference electrode and an electric signal control device; and the working electrode is prepared by coating a gallium-copper bimetallic monatomic nano-enzyme and a conductive carbon paste on a side of a flexible carrier; and a synthetic method for the gallium-copper bimetallic monatomic nano-enzyme comprises the following steps:

S1: mixing copper nitrate trihydrate, aluminum nitrate nonahydrate, anhydrous copper chloride and anhydrous gallium chloride with a first solvent to obtain a solution A, wherein, in the solution A, a concentration of the copper nitrate trihydrate is 12 mM to 18 mM, a concentration of the aluminum nitrate nonahydrate is 4 mM to 7 mM, and concentrations of the anhydrous copper chloride and the anhydrous gallium chloride are both 1.5 mg/mL to 2.5 mg/mL;

S2: mixing sodium hydroxide with a second solvent to obtain a solution B, wherein, in the solution B, a concentration of the sodium hydroxide is 0.05 g/mL to 0.15 g/mL; and S3: dropwise adding the solution A and the solution B into a reaction solvent at the same time, maintaining a stable pH during the dropwise addition to obtain a mixture, stirring the mixture and subjecting the mixture to a reaction after the dropwise addition, filtering the mixture to collect a filter residue after the reaction, and sequentially washing, drying and grinding the filter residue into powder, so as to obtain the gallium-copper bimetallic monatomic nano-enzyme, wherein a ratio of a solvent volume of the solution A and a solvent volume of the solution B to a solvent volume of the reaction solvent is 1:1:2.

2. The preparation method for the bimetallic monatomic nano-enzyme electrochemical sensor according to claim 1, comprising the following steps:

first step: printing a conductive silver paste screen a middle portion of the side of the flexible carrier, and curing the conductive silver paste screen at 60° C. for 30 min to form the reference electrode;

second step: printing a conductive carbon paste screen on one lateral portion of the side of the flexible carrier, and curing the conductive carbon paste screen at 60° C. for 30 min to form the counter electrode;

third step: mixing the gallium-copper bimetallic monatomic nano-enzyme with the conductive carbon paste according to a mass ratio of 1:1 to obtain a compound; and coating the compound on another lateral portion of the other side of the flexible carrier, and curing the compound to form the working electrode;

fourth step: printing a layer of insulating ink on the side of the flexible carrier, and curing the insulating ink at 60° C. for 20 min to obtain a bimetallic monatomic nano-enzyme electrochemical sensor chip; and fifth step: connecting the reference electrode, the counter electrode and the working electrode with the electric signal control device to construct the bimetallic monatomic nano-enzyme electrochemical sensor.

3. The preparation method for the bimetallic monatomic nano-enzyme electrochemical sensor according to claim 2, wherein the flexible carrier is polyethyleneimine.

\* \* \* \* \*